United States Patent
McDonald et al.

(10) Patent No.: US 7,538,535 B2
(45) Date of Patent: May 26, 2009

(54) ERROR VOLTAGE RIPPLE COMPENSATION TO EXTEND BANDWIDTH OF A FEEDBACK LOOP IN A DC-TO-DC CONVERTER

(75) Inventors: Brent A. McDonald, Round Rock, TX (US); Daniel E. Jenkins, Bastrop, TX (US)

(73) Assignee: Dell Products L.P., Round Rock, TX (US)

( * ) Notice: Subject to any disclaimer, the term of this patent is extended or adjusted under 35 U.S.C. 154(b) by 222 days.

(21) Appl. No.: 11/331,676

(22) Filed: Jan. 13, 2006

(65) Prior Publication Data

US 2007/0165427 A1 Jul. 19, 2007

(51) Int. Cl.
*G05F 1/565* (2006.01)
*G05F 5/00* (2006.01)
*H02M 1/14* (2006.01)

(52) U.S. Cl. .................. 323/288; 323/299; 323/286; 363/39

(58) Field of Classification Search ............... 323/288, 323/300, 299, 286, 242, 243, 326, 282, 285; 363/39
See application file for complete search history.

(56) References Cited

U.S. PATENT DOCUMENTS

| | | | |
|---|---|---|---|
| 5,982,640 A * | 11/1999 | Naveed et al. | 363/21.15 |
| 6,377,032 B1 * | 4/2002 | Andruzzi et al. | 323/224 |
| 6,465,993 B1 | 10/2002 | Clarkin et al. | 323/272 |
| 6,583,610 B2 | 6/2003 | Groom et al. | 323/288 |
| 6,661,210 B2 | 12/2003 | Kimball et al. | 323/268 |
| 6,791,306 B2 | 9/2004 | Waltes et al. | 323/288 |
| 6,804,091 B2 | 10/2004 | Jenkins et al. | 361/18 |
| 6,819,154 B2 * | 11/2004 | Greenfeld | 327/172 |
| 7,145,317 B1 * | 12/2006 | Shah | 323/288 |
| 7,202,642 B1 * | 4/2007 | Chen et al. | 323/222 |
| 7,358,707 B2 | 4/2008 | Johnson et al. | 323/267 |
| 7,408,328 B2 | 8/2008 | Johnson et al. | 323/222 |

* cited by examiner

*Primary Examiner*—Akm E Ullah
(74) *Attorney, Agent, or Firm*—Baker Botts L.L.P.

(57) ABSTRACT

Control loop ripple voltage in an error amplifier may be the result of a non-linear time varying behavior of a switch mode power conversion process. An inverse waveform replica of the error amplifier control loop ripple voltage waveform may be generated to substantially cancel the non-linear loop dynamics introduced by the control loop ripple voltage. Once the control loop ripple voltage is substantially cancelled the bandwidth of the DC-to-DC converter control loop may be increased for faster loop response thus reducing the need for additional output filter capacitance.

23 Claims, 3 Drawing Sheets

ERROR VOLTAGE RIPPLE COMPENSATION TO EXTEND BANDWIDTH OF A FEEDBACK LOOP IN A DC-TO-DC CONVERTER

TECHNICAL FIELD

The present disclosure relates generally to DC-to-DC converters in information handling systems and, more particularly, error voltage compensation for extended bandwidth in the feedback loop of the DC-to-DC converter.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

Information handling systems are becoming more and more important in both business and personal life. The engine of the information handling system is the microprocessor. The microprocessor has continued to evolve in sophistication by achieving faster operation and greater computational capacity. However with this evolution, the amount of rapid changes in current drawn by the microprocessor (current steps) has been increasing while operating voltage tolerance ranges (bands) have been decreasing. The increased current steps caused by operation of the microprocessor and its need for tighter (smaller) voltage tolerance range(s) places greater demands on the DC-to-DC converter(s) used to generate the required operating voltage(s) of the microprocessor. The problem in keeping the DC-to-DC converter output voltage in tolerance range for the microprocessor may be addressed by increasing the output filter capacitance and/or increasing the bandwidth of the DC-to-DC converter regulation feedback loop.

Present technology DC-to-DC converters are limited in the gain/bandwidth of the feedback loop because of the voltage ripple present on the error amplifier output. The error amplifier output voltage ripple puts a limit on loop gain versus higher frequency response and thus limits bandwidth of the loop filter and thereby step response time. Therefore, a DC-to-DC converter having limited loop bandwidth may require additional output capacitors that will increase the cost thereof.

SUMMARY

What is needed is a way to increase loop bandwidth of a DC-to-DC converter so that additional output filter capacitors may not be required for a desired voltage regulation during large current step demand from a load, e.g., microprocessor.

An alternating current (AC) ripple term may be derived that may be substantially inversely proportional to the ripple appearing on the output of the error amplifier of a DC-to-DC converter. The error amplifier ripple may be the result of the non-linear time varying behavior of the switch mode power conversion process. The ripple cancellation term may be synthetically generated and may be used to substantially cancel the non-linear loop dynamics introduced by the output voltage ripple. Once the output voltage ripple on the feedback loop is substantially eliminated the DC-to-DC converter feedback loop bandwidth may be increased, thus reducing the need for additional output filter capacitance and the associated cost increase thereof.

According to a specific example embodiment of this disclosure, a DC-to-DC converter having error voltage ripple compensation for extending bandwidth in the feedback loop thereof is controlled by a pulse width modulation (PWM) generator that charges and discharges an inductor; has a feedback loop filter/amplifier with an input coupled to an output of the DC-to-DC converter; a ripple compensation voltage capacitor; a first current source coupled to the ripple compensation voltage capacitor, wherein the first current source charges the ripple compensation voltage capacitor when the PWM generator charges the inductor; a second current source coupled to the ripple compensation voltage capacitor, wherein the second current source discharges the ripple compensation voltage capacitor when the PWM generator discharges the inductor; a high pass filter and compensation scaler having an input coupled to the ripple compensation voltage capacitor; and a voltage adder having a first input coupled to an output of the feedback loop filter/amplifier, a second input coupled to an output of the high pass filter and compensation scaler and an output coupled to an input of the PWM generator; wherein a ripple compensation voltage from the output of the high pass filter and compensation scaler and a feedback loop error voltage from the output of the feedback loop filter/amplifier are added together in the voltage adder such that ripple voltage on the feedback loop error voltage is substantially reduced to the input of the PWM generator.

According to still another specific example embodiment of this disclosure, a method to compensate for error voltage ripple in the feedback loop of a DC-to-DC converter comprises the steps of: controlling a DC-to-DC converter with a pulse width modulation (PWM) generator, wherein the PWM generator charges and discharges an inductor; coupling a feedback loop filter/amplifier to an output of the DC-to-DC converter, wherein the feedback loop filter/amplifier generates a feedback loop error voltage to the PWM generator; charging a ripple compensation voltage capacitor with a first current source when the PWM generator charges the inductor; discharging the ripple compensation voltage capacitor with a second current source when the PWM generator discharges the inductor; generating a ripple compensation voltage from the charge on the ripple compensation voltage capacitor; and adding the ripple compensation voltage to the feedback loop error voltage so as to substantially reduce a ripple voltage on the feedback loop error voltage.

According to another specific example embodiment of this disclosure, an information handing system may comprise a DC-to-DC converter having error voltage ripple compensation for extending bandwidth in the feedback loop thereof, and powering at least one processor, the DC-to-DC converter being controlled by a pulse width modulation (PWM) generator, wherein the PWM generator charges and discharges an inductor; a feedback loop filter/amplifier having an input coupled to an output of the DC-to-DC converter; a ripple compensation voltage capacitor; a first current source coupled to the ripple compensation voltage capacitor, wherein the first current source charges the ripple compensation voltage capacitor when the PWM generator charges the inductor; a second current source coupled to the ripple compensation voltage capacitor, wherein the second current source discharges the ripple compensation voltage capacitor when the PWM generator discharges the inductor; a high pass filter and compensation scaler having an input coupled to the ripple compensation voltage capacitor; and a voltage adder having a first input coupled to an output of the feedback loop filter/amplifier, a second input coupled to an output of the high pass filter and compensation scaler, and an output coupled to an input of the PWM generator; wherein a ripple compensation voltage from the output of the high pass filter and compensation scaler and a feedback loop error voltage from the output of the feedback loop filter/amplifier are added together in the voltage adder such that ripple voltage on the feedback loop error voltage is substantially reduced to the input of the PWM generator.

BRIEF DESCRIPTION OF THE DRAWINGS

A more complete understanding of the present disclosure thereof may be acquired by referring to the following description taken in conjunction with the accompanying drawings wherein.

Figure 1:
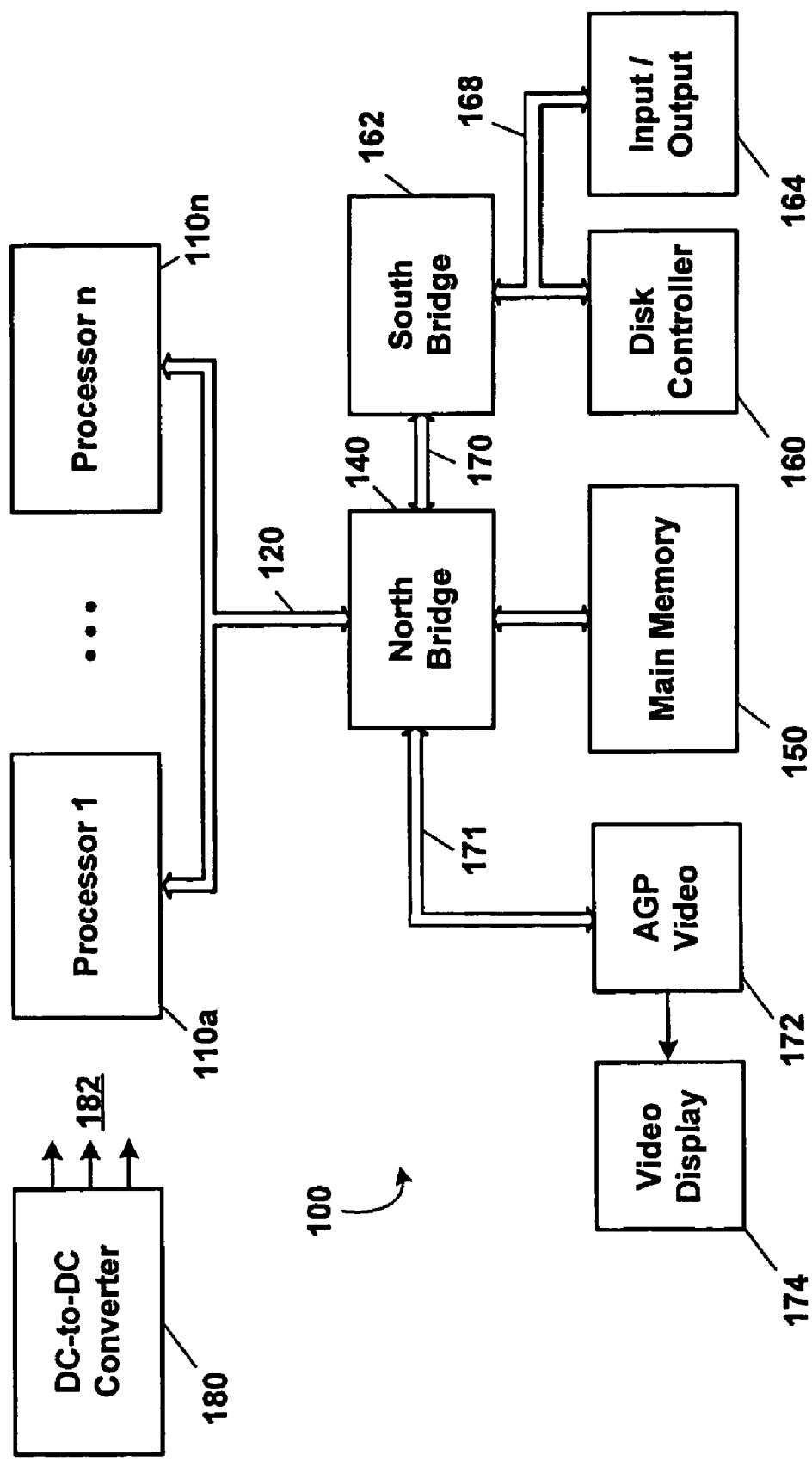
FIG. 1 is a schematic block diagram of an information handling system, according to a specific example embodiment of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of a specific example embodiment is schematically illustrated. Like elements in the drawings will be represented by like numbers, and similar elements will be represented by like numbers with a different lower case letter suffix.

Referring to FIG. 1, depicted is an information handling system having electronic components mounted on at least one printed circuit board (PCB) (motherboard) and communicating data and control signals therebetween over signal buses, according to a specific example embodiment of the present disclosure. In one example embodiment, the information handling system is a computer system. The information handling system, generally referenced by the numeral 100, comprise at least one physical processor 110, generally represented by processors 110a-110n, coupled to a host bus(es) 120. A north bridge 140, which may also be referred to as a memory controller hub or a memory controller, is coupled to a main system memory 150. The north bridge 140 is coupled to the at least one processor 110 via the host bus(es) 120. The north bridge 140 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 140. The chip set may also be packaged as an application specific integrated circuit (ASIC). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus(es), e.g., PCI bus 170, AGP bus 171 coupled to a video graphics interface 172 which drives a video display 174. A third bus(es) 168 may also comprise other industry standard buses or proprietary buses, e.g., ISA, SCSI, I²C, SPI, USB buses through a south bridge(s) (bus interface) 162. A disk controller 160 and input/output interface(s) 164 may be coupled to the third bus(es) 168. At least one DC-to-DC converter may be adapted to provide appropriate DC voltage(s) 182 to the aforementioned information handling system components, e.g., at least one processor 110.

Figure 2:
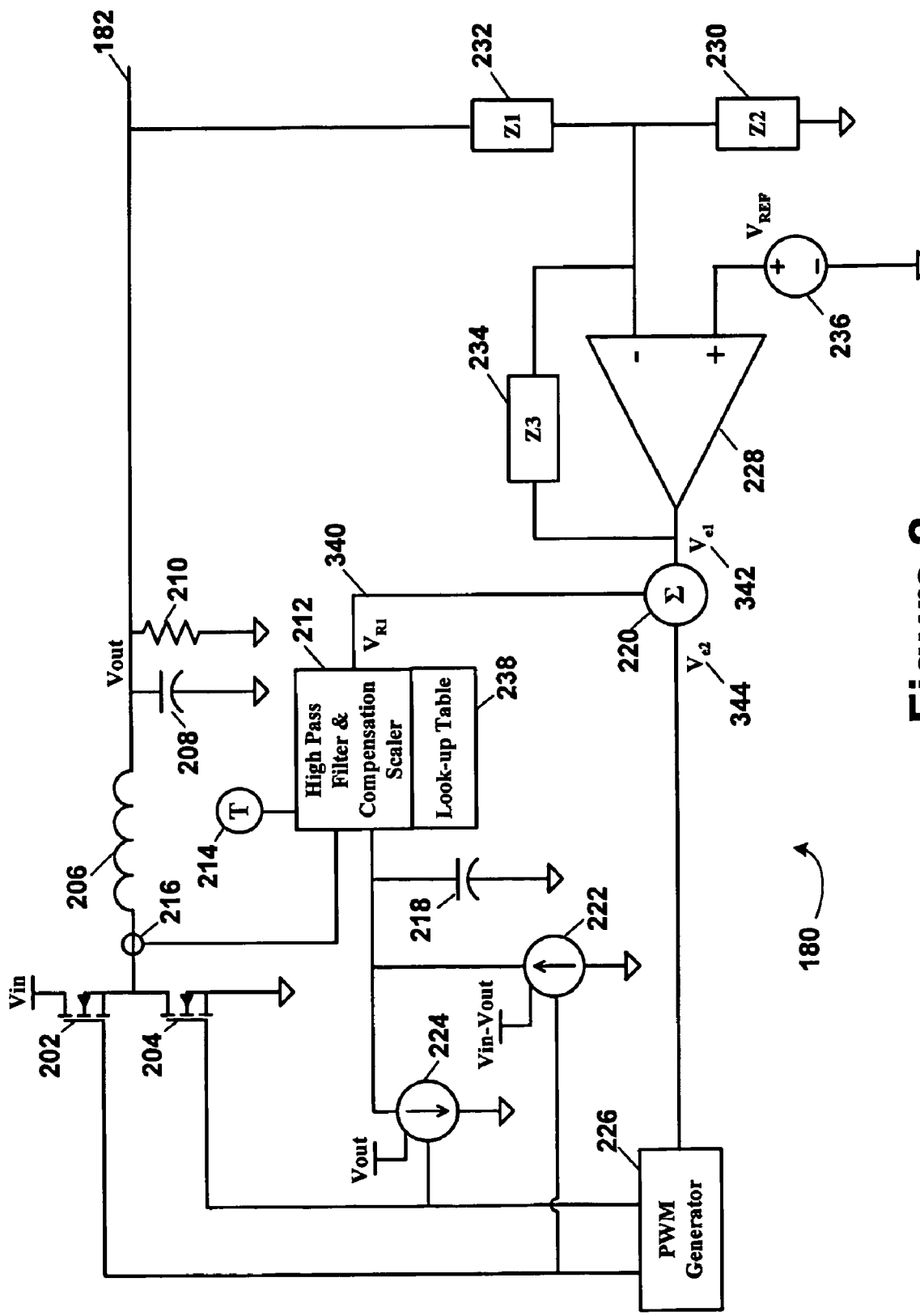
FIG. 2 is a schematic diagram of a DC-to-DC converter having ripple cancellation in its feedback loop, according to a specific example embodiment of the present disclosure.

Referring now to FIG. 2, depicted is a schematic diagram of a DC-to-DC converter having ripple cancellation in its feedback loop, according to a specific example embodiment of the present disclosure. A typical DC-to-DC buck converter may comprise an inductor charging switch 202, e.g., power MOSFET, an inductor discharge switch 204, e.g., power MOSFET, an inductor 206, an output filter capacitor 208, a load resistor 210, a feedback loop comprising an operational amplifier 228, a bias and gain setting network having impedances 230, 232 and 234, a voltage reference 236, and a pulse width modulation (PWM) generator 226. An output voltage 182 is sampled by the feedback loop and a error voltage may be sent to the PWM generator 226 which thereby controls the times in which the charging switch 202 and discharge switch 204 are on and off. By alternately coupling the inductor 206 to Vin and common (ground) the DC-to-DC converter may generate a regulated output voltage 182 (Vout). A DC-to-DC buck converter is shown, however, any type of DC-to-DC converter, e.g., buck-boost, boost, etc., may be used in accordance with the teachings of this disclosure.

Figure 3:
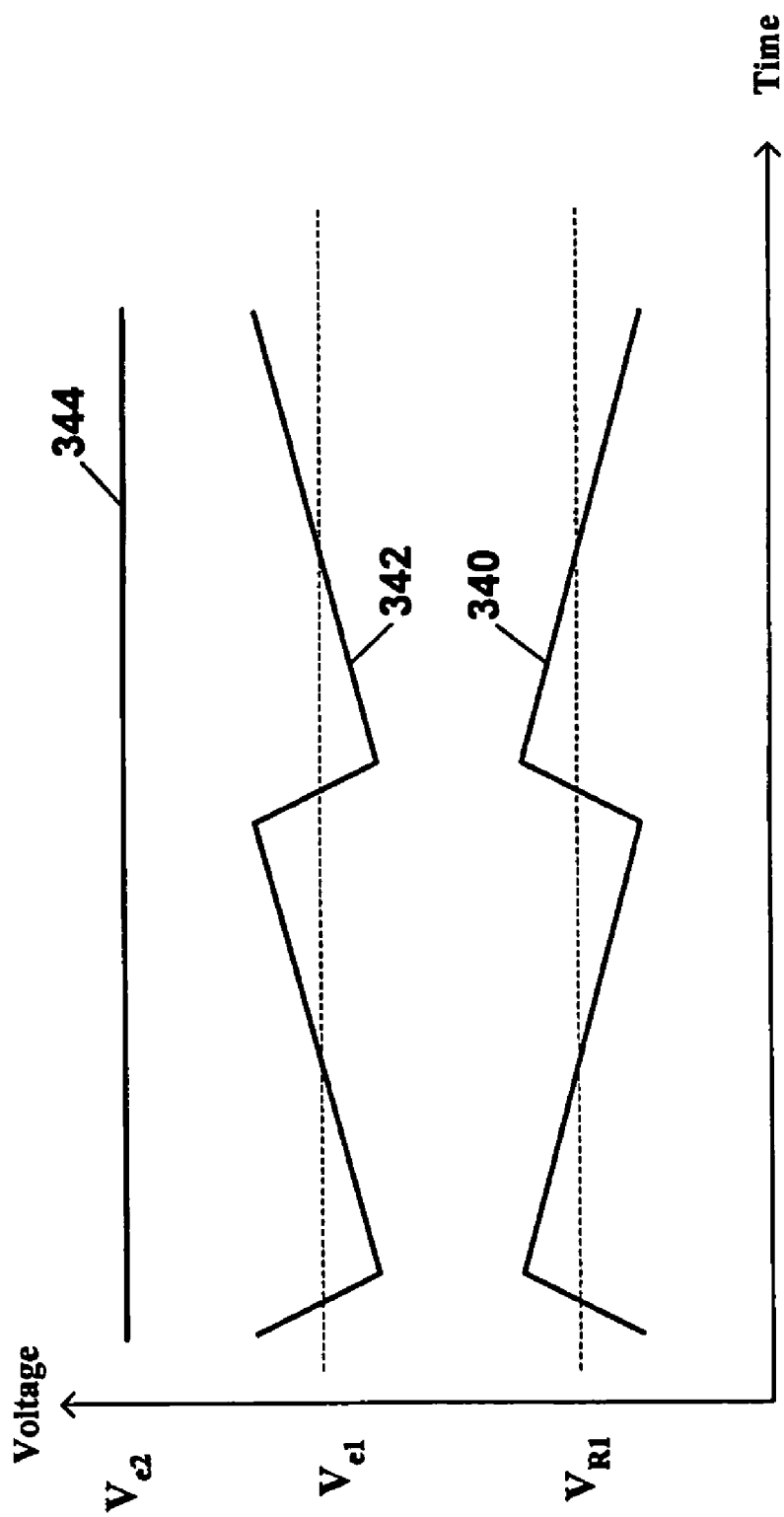
FIG. 3 is a waveform timing diagram of voltages associated with ripple cancellation for the feedback loop of the DC-to-DC converter shown in FIG. 2.

Referring now also to FIG. 3, depicted is a waveform timing diagram of voltages associated with ripple cancellation for the feedback loop of the DC-to-DC converter shown in FIG. 2. current sources 222 and 224 may be coupled to and controlled by the PWM generator 226. The current source 222 may charge a capacitor 218 whenever the PWM generator turns on the charging switch 202, and the current source 224 may discharge the capacitor 218 whenever the PWM generator turns on the discharge switch 204. The charging and discharging of the capacitor 218 by the current sources 222 and 224, respectively, may produce a voltage waveform on the capacitor 218 that may be substantially a replica waveform of the AC component ripple voltage waveform at the switching frequency that may be present on the output voltage 182.

A high pass filter and compensation scaler 212 may be coupled to the capacitor 218 and may be used to substantially remove any direct current (DC) voltage component from the voltage waveform on the capacitor 218 and may also be used to scale the amplitude and/or phase shift thereof. An AC voltage waveform 340, $V_{R1}$, from the high pass filter and compensation scaler 212 may be applied to a voltage adder 220. A ripple compensated error voltage 344, $V_{e2}$, may be derived by adding together an uncompensated error voltage 342, $V_{e1}$, from the operational amplifier 228 and the AC voltage waveform 340. Since the AC voltage waveform 340, $V_{R1}$, may be substantially a replica of the AC ripple voltage waveform (DC component substantially removed) at the switching frequency that may be present on the output voltage 182, the ripple compensated error voltage 344, $V_{e2}$, may therefore be substantially the difference between the uncompensated error voltage 342, $V_{e1}$, and the AC voltage waveform 340, $V_{R1}$. Examples of the waveforms of the voltages 340, 342 and 344 are graphically depicted in FIG. 3.

Since the AC ripple present in the output of the operational amplifier 228 may be substantially removed according to the teachings of this disclosure, the bias and gain setting network impedances 230, 232 and 234 may be configured so that the loop has more gain at higher frequencies, thus allowing a faster response to voltage fluctuations that may be caused by rapid load changes.

It is contemplated and within the scope of this disclosure that a DC-to-DC converter may have characteristics that may be non-linear as a function of load current and/or temperature. Therefore, a current sensor 216 may be used to supply load current information to the high pass filter and compensation scaler 212 so that the amplitude and/or phase shift of the AC voltage waveform 340, $V_{R1}$, may be compensated accordingly. Similarly, a temperature sensor 214 may be used to convey the DC-to-DC converter temperature information to the high pass filter and compensation scaler 212 so that the amplitude and/or phase shift of the AC voltage waveform 340, $V_{R1}$, may be compensated accordingly. The non-linear current and/or temperature characteristic compensation factors, e.g., amplitude and/or phase shift adjustment, may be stored in a look-up table 238, e.g., non-volatile memory such as Flash memory, EEPROM, etc.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A DC-to-DC converter having error voltage ripple compensation for extending bandwidth in the feedback loop thereof, comprising:
   a pulse width modulation (PWM) generator, wherein the PWM generator controls the DC-to-DC converter and charges and discharges an inductor;
   a feedback loop filter/amplifier having an input coupled to an output of the DC-to-DC converter;
   a ripple compensation voltage capacitor;
   a first current source coupled to the ripple compensation voltage capacitor, wherein the first current source charges the ripple compensation voltage capacitor when the PWM generator charges the inductor;
   a second current source coupled to the ripple compensation voltage capacitor, wherein the second current source discharges the ripple compensation voltage capacitor when the PWM generator discharges the inductor;
   a high pass filter and compensation scaler having an input coupled to the ripple compensation voltage capacitor; and
   a voltage adder having a first input coupled to an output of the feedback loop filter/amplifier, a second input coupled to an output of the high pass filter and compensation scaler, and an output coupled to an input of the PWM generator;
   wherein a ripple compensation voltage from the output of the high pass filter and compensation scaler and a feedback loop error voltage from the output of the feedback loop filter/amplifier are added together in the voltage adder such that ripple voltage on the feedback loop error voltage is substantially reduced to the input of the PWM generator.

2. The DC-to-DC converter according to claim 1, wherein the ripple compensation voltage amplitude is adjusted with the high pass filter and compensation scaler.

3. The DC-to-DC converter according to claim 2, further comprising a current sensor for measuring load current, wherein the current sensor output is coupled to the high pass filter and compensation scaler so that the ripple compensation voltage amplitude may be adjusted as a function of load current.

4. The DC-to-DC converter according to claim 3, further comprising a look-up table for storing load current compensation parameters for the ripple compensation voltage.

5. The DC-to-DC converter according to claim 4, wherein the look-up table is a non-volatile memory.

6. The DC-to-DC converter according to claim 2, further comprising a temperature sensor for measuring temperature, wherein the temperature sensor output is coupled to the high pass filter and compensation scaler so that the ripple compensation voltage amplitude may be adjusted as a function of temperature.

7. The DC-to-DC converter according to claim 6, further comprising a look-up table for storing temperature compensation parameters for the ripple compensation voltage.

8. The DC-to-DC converter according to claim 7, wherein the look-up table is a non-volatile memory.

9. The DC-to-DC converter according to claim 1, wherein the ripple compensation voltage phase is adjusted with the high pass filter and compensation scaler.

10. The DC-to-DC converter according to claim 9, further comprising a current sensor for measuring load current, wherein the current sensor output is coupled to the high pass filter and compensation scaler so that the ripple compensation voltage phase may be adjusted as a function of load current.

11. The DC-to-DC converter according to claim 9, further comprising a temperature sensor for measuring temperature, wherein the temperature sensor output is coupled to the high pass filter and compensation scaler so that the ripple compensation voltage phase may be adjusted as a function of temperature.

12. The DC-to-DC converter according to claim 1, wherein the feedback loop filter/amplifier comprises:
   an operational amplifier having a gain setting and feedback loop bandwidth impedance network; and
   a voltage reference coupled to an input of the operational amplifier, wherein the feedback loop error voltage is derived from a difference in voltage between the output of the DC-to-DC converter and the voltage reference.

13. The DC-to-DC converter according to claim 1, wherein the first current source level is proportional to a voltage from the output of the DC-to-DC converter.

14. The DC-to-DC converter according to claim 1, wherein the second current source is proportional to a voltage that is the difference between an input voltage and an output voltage of the DC-to-DC converter.

15. The DC-to-DC converter according to claim 1, wherein the DC-to-DC converter is a buck DC-to-DC converter.

16. The DC-to-DC converter according to claim 1, further comprising a look-up table for storing compensation parameters for the ripple compensation voltage.

17. A method to compensate for error voltage ripple in the feedback loop of a DC-to-DC converter, said method comprising the steps of:
   controlling the DC-to-DC converter with a pulse width modulation (PWM) generator, wherein the PWM generator charges and discharges an inductor;
   coupling a feedback loop filter/amplifier to an output of the DC-to-DC converter, wherein the feedback loop filter/amplifier generates a feedback loop error voltage to the PWM generator;
   charging a ripple compensation voltage capacitor with a first current source when the PWM generator charges the inductor;
   discharging the ripple compensation voltage capacitor with a second current source when the PWM generator discharges the inductor;
   generating a ripple compensation voltage from the charge on the ripple compensation voltage capacitor;
   measuring one of a load current and a temperature of the DC-to-DC converter;
   adding the ripple compensation voltage to the feedback loop error voltage so as to substantially reduce a ripple voltage on the feedback loop error voltage; and
   adjusting the ripple compensation voltage according to the measured load current.

18. The method according to claim 17, wherein the step of adjusting the ripple compensation voltage includes the step of adjusting the ripple compensation voltage amplitude according to the measured load current.

19. The method according to claim 17, wherein the step of adjusting the ripple compensation voltage includes the step of adjusting the ripple compensation voltage phase according to the measured load current.

20. A method to compensate for error voltage ripple in the feedback loop of a DC-to-DC converter, said method comprising the steps of:
   controlling the DC-to-DC converter with a pulse width modulation (PWM) generator, wherein the PWM generator charges and discharges an inductor;
   coupling a feedback loop filter/amplifier to an output of the DC-to-DC converter, wherein the feedback loop filter/amplifier generates a feedback loop error voltage to the PWM generator;
   charging a ripple compensation voltage capacitor with a first current source when the PWM generator charges the inductor;
   discharging the ripple compensation voltage capacitor with a second current source when the PWM generator discharges the inductor;
   generating a ripple compensation voltage from the charge on the ripple compensation voltage capacitor;
   measuring one of a load current and a temperature of the DC-to-DC converter;
   adding the ripple compensation voltage to the feedback loop error voltage so as to substantially reduce a ripple voltage on the feedback loop error voltage; and
   adjusting the ripple compensation voltage according to the measured temperature.

21. The method according to claim 20, wherein the step of adjusting the ripple compensation voltage includes the step of adjusting the ripple compensation voltage amplitude according to the measured temperature.

22. The method according to claim 20, wherein the step of adjusting the ripple compensation voltage includes the step of adjusting the ripple compensation voltage phase according to the measured temperature.

23. An information handling system powered from a DC-to-DC converter having error voltage ripple compensation for extending bandwidth in the feedback loop thereof, said system comprising:
   at least one processor powered from the DC-to-DC converter, the DC-to-DC converter being controlled by a pulse width modulation (PWM) generator, wherein the PWM generator charges and discharges an inductor;
   a feedback loop filter/amplifier having an input coupled to an output of the DC-to-DC converter;
   a ripple compensation voltage capacitor;
   a first current source coupled to the ripple compensation voltage capacitor, wherein the first current source charges the ripple compensation voltage capacitor when the PWM generator charges the inductor;
   a second current source coupled to the ripple compensation voltage capacitor, wherein the second current source discharges the ripple compensation voltage capacitor when the PWM generator discharges the inductor;
   a high pass filter and compensation scaler having an input coupled to the ripple compensation voltage capacitor; and
   a voltage adder having a first input coupled to an output of the feedback loop filter/amplifier, a second input coupled to an output of the high pass filter and compensation scaler, and an output coupled to an input of the PWM generator;
   wherein a ripple compensation voltage from the output of the high pass filter and compensation scaler and a feedback loop error voltage from the output of the feedback loop filter/amplifier are added together in the voltage adder such that ripple voltage on the feedback loop error voltage is substantially reduced to the input of the PWM generator.

* * * * *